US012296357B2

(12) United States Patent
Furman et al.

(10) Patent No.: US 12,296,357 B2
(45) Date of Patent: May 13, 2025

(54) IN SITU LINER PRODUCTION SYSTEM AND METHOD

(71) Applicant: KIINNS FOODTECH LTD., Kfar Vradim (IL)

(72) Inventors: Ehud Furman, Nesher (IL); Tzvi Furman, Kfar Vradim (IL)

(73) Assignee: KIINNS FOODTECH LTD., Kfar Vradim (IL)

(*) Notice: Subject to any disclaimer, the term of this patent is extended or adjusted under 35 U.S.C. 154(b) by 36 days.

(21) Appl. No.: 17/594,678

(22) PCT Filed: Apr. 26, 2020

(86) PCT No.: PCT/IL2020/050467
§ 371 (c)(1),
(2) Date: Oct. 26, 2021

(87) PCT Pub. No.: WO2020/222227
PCT Pub. Date: Nov. 5, 2020

(65) Prior Publication Data

US 2022/0203399 A1 Jun. 30, 2022

Related U.S. Application Data

(60) Provisional application No. 62/839,814, filed on Apr. 29, 2019.

(51) Int. Cl.
*B05D 1/02* (2006.01)
*B05B 12/08* (2006.01)
(Continued)

(52) U.S. Cl.
CPC .............. *B05D 1/02* (2013.01); *B05B 12/084* (2013.01); *B05B 13/0636* (2013.01); *B05D 3/067* (2013.01); *B05D 2259/00* (2013.01)

(58) Field of Classification Search
None
See application file for complete search history.

(56) References Cited

U.S. PATENT DOCUMENTS 4,320,699 A 3/1982 Binks
6,174,932 B1 * 1/2001 Pachl ........................ C09K 3/10 522/74

(Continued)

FOREIGN PATENT DOCUMENTS

CN 104841593 A 8/2015
CN 108130506 A 6/2018

(Continued)

OTHER PUBLICATIONS

Removing a Factory Chevrolet Bedliner, Tools in Action; available at https://www.youtube.com/watch?v=ayTf4zRLEH8; published Aug. 18, 2016.*

*Primary Examiner* — Michael P. Rodriguez
(74) *Attorney, Agent, or Firm* — Dorsey & Whitney LLP

(57) ABSTRACT

A system for the in situ production of a liner suitable to shield active surfaces of apparatus for the processing of liquids and/or solids from coming into contact with, and being fouled by, the processed materials, comprises: 1) a spray head, adapted to spray a layer of curable polymeric material onto a surface; 2) circuitry adapted to direct the movement of said spray head according to data pertaining to the surface to be sprayed; and 3) curing apparatus, suitable to cure the layer of material sprayed onto said surface, thereby to produce a shielding liner in situ.

12 Claims, 10 Drawing Sheets

(51) Int. Cl.
*B05B 13/06* (2006.01)
*B05D 3/06* (2006.01)

(56) References Cited

U.S. PATENT DOCUMENTS

| | | | | |
|---|---|---|---|---|
| 8,168,299 | B1 * | 5/2012 | Locke ................ | C08G 18/6685<br>528/68 |
| 2005/0255249 | A1 | 11/2005 | Schlatterbeck et al. | |
| 2007/0289965 | A1 | 12/2007 | Greenfield | |
| 2015/0258768 | A1 | 9/2015 | Bernhard et al. | |
| 2016/0083829 | A1 | 3/2016 | Reid et al. | |
| 2016/0244212 | A1 | 8/2016 | Destal et al. | |
| 2016/0286796 | A1 | 10/2016 | Lu et al. | |

FOREIGN PATENT DOCUMENTS

| | | | |
|---|---|---|---|
| WO | 2010127738 | A1 | 11/2010 |
| WO | 2017125913 | A1 | 7/2017 |

* cited by examiner

IN SITU LINER PRODUCTION SYSTEM AND METHOD

FIELD OF THE INVENTION

The present invention relates to the processing of fluids and solids. More particularly, the invention relates to the use of liners in material processing apparatus.

BACKGROUND OF THE INVENTION

Fluids and solids processing is performed in a variety of equipment units, and it includes heating, cooling, mixing, blending, chopping, slurring, conveying, frothing of liquids, etc. Such equipment units are operated in industrial production lines and laboratories, and in home kitchens. Illustrative examples of such apparatus include food processors, mixers, dough kneaders, milk frothers, blenders, and conveyors. A processing unit typically comprises a container in which the ingredient food and beverage material(s) are processed and held, and a processing head, functionally placed in several optional positions within the container, and coupled to a driving system.

Current processing procedures unavoidably require cleaning the internal walls or working surfaces of the processing equipment, and exhibit severe drawbacks in respect of which the following considerations should be taken into account:

Food safety: Food equipment's hygiene level is highly dependent on the level of equipment cleaning, and may suffer from ineffective or insufficient cleaning, leaving bacterial residues that may cause health risks. Bacteria may develop resistance to cleaning processes and remain on the equipment even after cleaning. Residues of food allergens and even chemicals from the cleaning process itself, remaining on the equipment, can cause severe health risks.

Negative environmental impact: During the cleaning process, large amounts of water are wasted and detergents and organic waste flow to the sewage systems, polluting the environment.

High operational costs: Cleaning of processing equipment is costly and complicates production scheduling and operations.

To date, the art has not provided means for addressing all such drawbacks, and the cleaning derived problems strongly and negatively affect production lines, as well as home users. It is therefore an object of the present invention to provide a system capable of preventing the fouling of processing equipment by the processed materials, thereby eliminating the need to clean them after each cycle or periodically, and the problems related thereto.

WO 2017/125913 of the same inventors hereof relates to a functional shielding layer for processing apparatus, comprising a shielding liner manufactured externally to the processing equipment. The liner, which is made of a polymer suitable for the processed material, is then placed inside the processing equipment (a mixer bowl for instance) and mechanically attached to the working surfaces that usually come in contact and are fouled by processed material.

While the abovementioned shield is useful and effective, it requires adaptation to the shielded equipment when manufactured, and then delivery to the equipment. It would therefore be highly desirable, and this is an object of the present invention, to provide a method and system that streamlines the manufacturing and delivery of a shielding layer to the processing equipment. This problem is solved by the invention, inter alia, by providing for the in situ production of a protective liner. By spraying and curing a protective layer directly on the working surfaces, absolute geometrical fitting is achieved, for any complex device structure, as well as adherence to the working surface.

SUMMARY OF THE INVENTION

In an aspect, the invention relates to a system for the in situ production of a liner suitable to shield active surfaces of apparatus for the processing of liquids and/or solids from coming into contact with, and being fouled by, the processed materials, comprising:

i) a spray head, adapted to spray a layer of curable polymeric material onto a surface;

ii) circuitry adapted to direct the movement of said spray head according to data pertaining to the surface to be sprayed;

iii) curing apparatus, suitable to cure the layer of material sprayed onto said surface, thereby to produce a shielding liner in situ.

The data pertaining to the surface to be sprayed can be acquired by scanning and mapping apparatus, which may be integrated in the system or may be separate, or the data pertaining to the surface to be sprayed is obtained from pre-prepared data such as, for example, processing device manufacturing CAD file.

The system of the invention is provided with curing apparatus, which comprises an energy source, such as for instance a UV light source, or a heat source.

The above and other characteristics, objects and advantages of the invention will be better understood from the description of embodiments thereof, with reference to the appended drawings.

DETAILED DESCRIPTION OF THE INVENTION

In the context of this application the terms "coating", "liner" and "shield," are used interchangeably.

Figure 1:
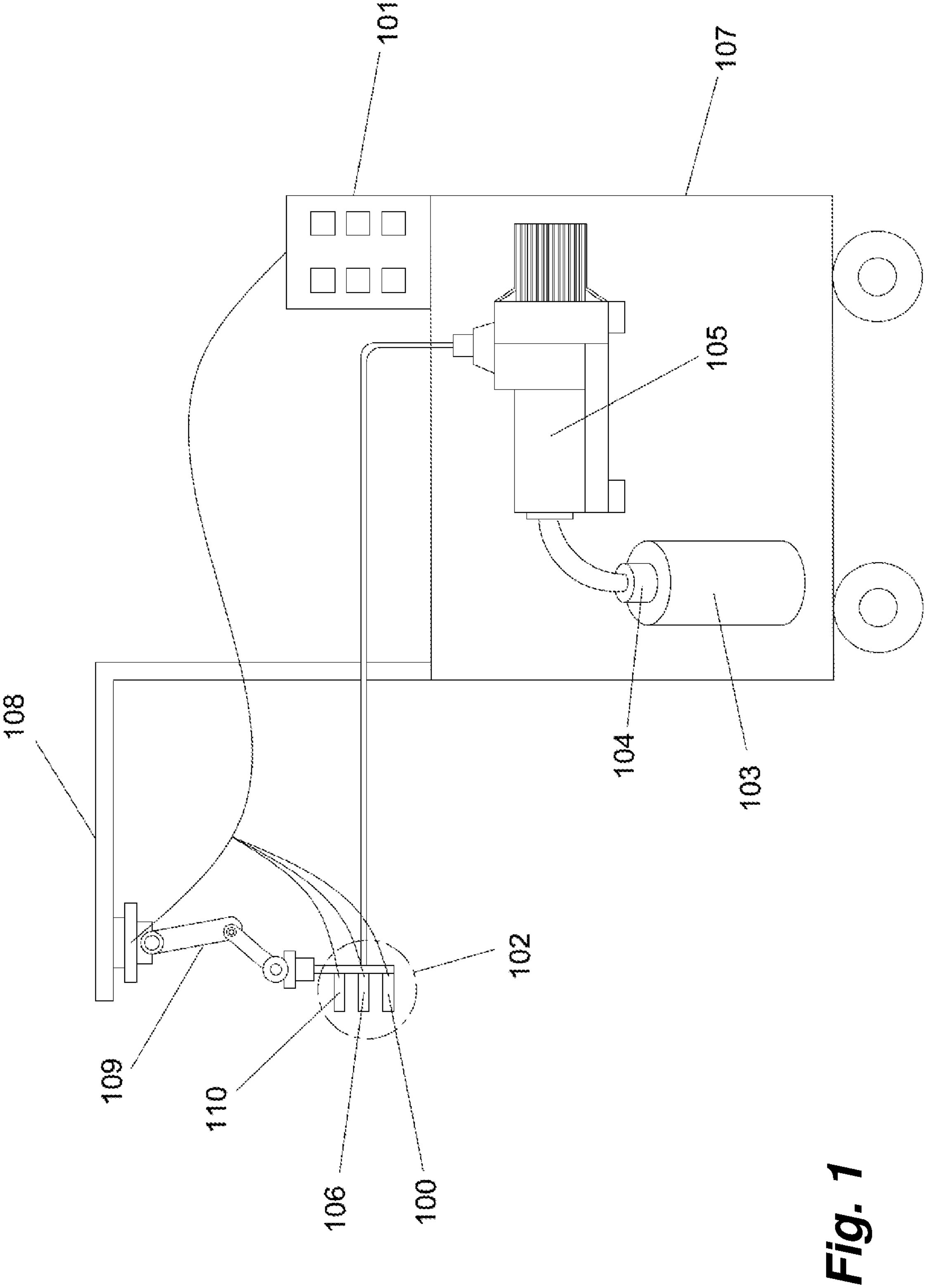
FIG. 1 schematically illustrates the overall layout of the shielding system, including central control unit, according to one embodiment of the invention.

The system of the invention comprises optical acquisition apparatus such as a 3D scanner and/or an imaging device suitable to inspect the entire surface to be shielded, to acquire data relative thereto, and to feed such data to the control unit. Data acquisition can be done either from an equipment catalog predefined in the computer/control unit, which can be updated from time to time, or by operating the optical acquisition apparatus. With reference to FIG. 1, which illustrates a simplified embodiment of the invention, a mapping/scanning monitoring head 100 is seen, which is adapted to scan the equipment surfaces to be shielded, and to provide data relative to a geometric mapping thereof. This enables the control unit 101 to acquire and define the shielding required surfaces, and to drive the robotic arm payload 102 (further described with reference to FIG. 5) to the appropriate trajectory, enabling the required surfaces to be shielded and covered as required.

The tank/container 103 of the liner material contains the sprayable coating material. The required values for the controllable valve 104, pump/regulator unit, 105, and spraying nozzles 106 are fed into the control unit 101, either manually by an operator, or automatically from a database containing data for the specific equipment. Such pre-determined parameters take into account the liner thickness to be set, sprayed beam diameter and flow specification, and their determination is well within the scope of the skilled person. Control unit 101 determines the spraying head motion rate, distance and orientation from the processing equipment's working surfaces, according to the physical parameters of the liner to be obtained.

Depending on the polymer used, different curing procedures are employed. For instance, UV curable polymers will require irradiating the surface of the equipment on which the material was sprayed, for a period of time necessary for performing the curing step. The required values for curing activity (energy density, dimensions of beam) are fed into control unit 101. These pre-determined parameters are evaluated considering the liner thickness that has been sprayed. Control unit 101 determine the curing head 110 energy source to be selected, the motion rate and distance and orientation from the container's walls to achieve a solid ready-to-work liner in the required time. Polymers suitable for use with the invention will be recognized by the skilled person. Some illustrative examples of such polymers are:

1. Radiation-driven cured materials based on (e.g.) hybrid or IPN systems, where the main film forming material is a naturally based polymer (e.g. polysaccharide/protein), mixed with a UV curable resin, susceptible to chain polymerization via photo initiation, as well as direct food contact approved allyl monomers such as TPGDA, TMPTA and TMPEOTA.

2. Spontaneously cured materials film forming natural materials (e.g. soluble starch, WPI, gelatin, alginate) that are pre dissolved in water, then added with an emulsifier (e.g. glycerol), followed by the addition of an unsaturated fatty acid (e.g. oleic or linoleic acids). In some cases an emulsion is generated via homogenization, and oxygen is removed to reduce the risk of crosslinking and the film is allowed to dry and cure. In some cases alkyd autoxidation reaction with air oxygen is the drive for the crosslinking reaction and the use of catalysis allows fast curing.

3. Also exemplary commercial material that may be employed include those described in http://watersoluble.green-cycles.com/wp-content/uploads/2019/12/Dossier-Ingles. Of, which are biodegradable, water-soluble, harmless, non-toxic, compostable, customizable, offering a variety of mechanical properties, thickness, temperature, formats, sizes. Green cycles polymeric material can be conveniently supplied in liquid form.

Figure 3:
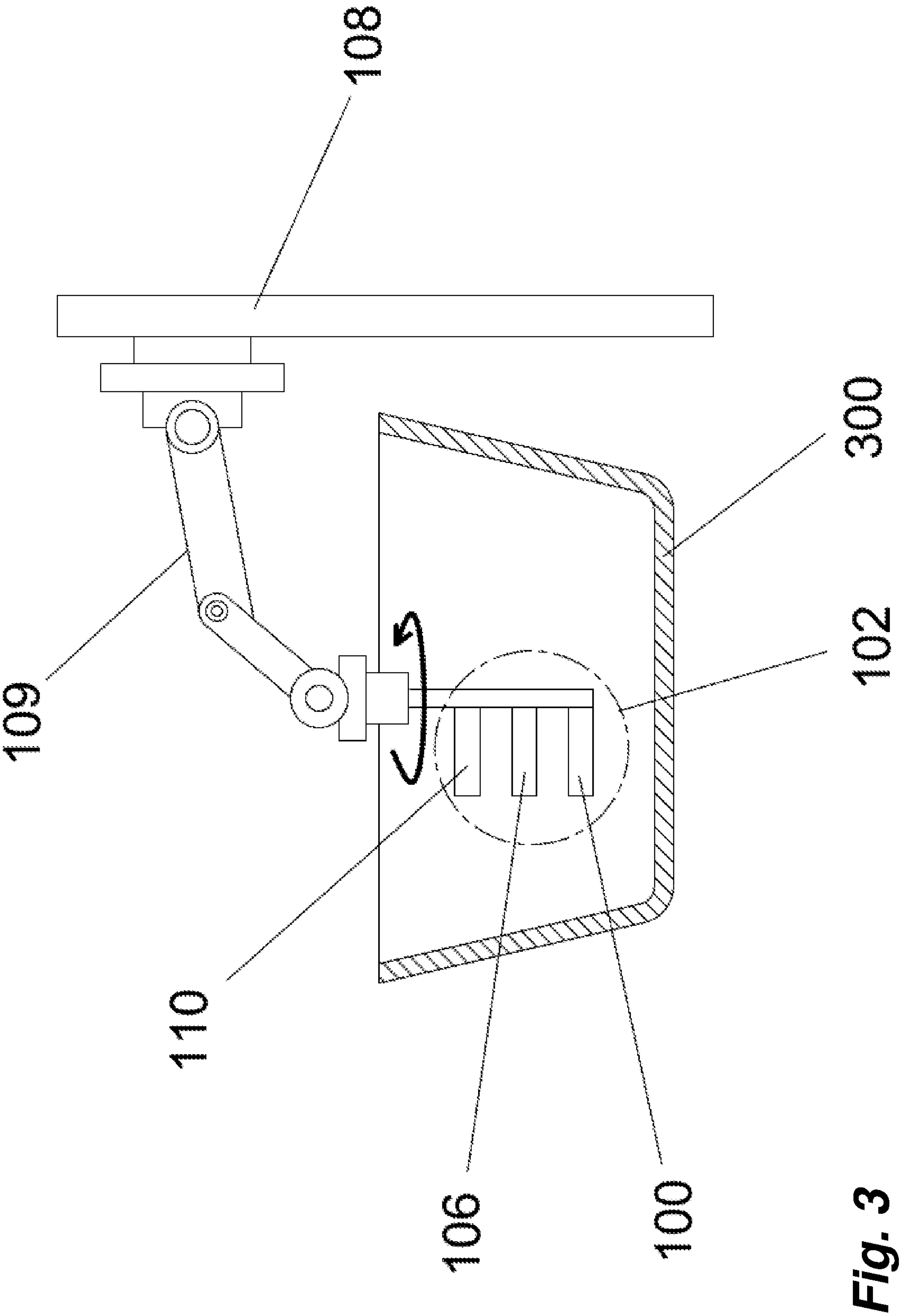
FIG. 3 is a schematic illustration of a robotic arm payload, according to one embodiment of the invention.

The system of the invention can be, in one particular embodiment, movable. In the illustrative embodiment of FIG. 1, the cart 107 on which the whole system is mounted with the operating head support structure 108, with the robotic arm 109, with the robotic arm payload 102, is brought into closed positioned relationship with the processing equipment 300 (as shown in FIG. 3) to be coated. Illustrative examples of equipment 300 include a food-mixer bowl, a conveyor, a dough-kneader etc. The control unit is set "on" and the robotic arm payload 102 is lowered towards the equipment, imparting the desired motion trajectory that has been pre-defined to the 6 degrees of freedom robotic arm 109 (e.g. an ABB robotic arm), which is known per se and therefore not discussed herein in detail, for the sake of brevity. Once the desired position is reached, spraying starts, and curing follows after spraying is completed on all of the required surfaces.

Figure 5:
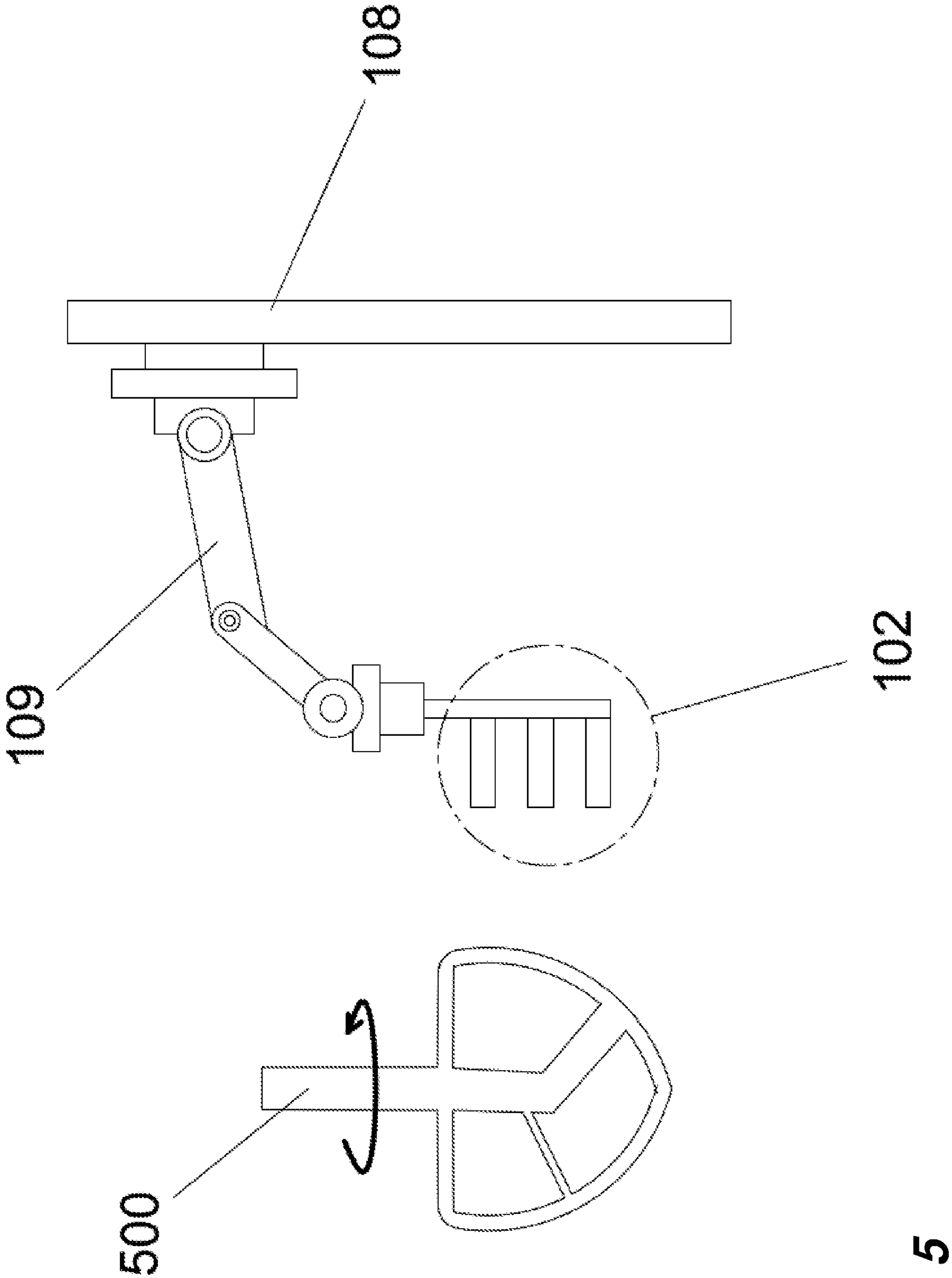
FIG. 5 schematically illustrates the shielding of an exemplary processing head according to one embodiment of the invention.
Figure 6:
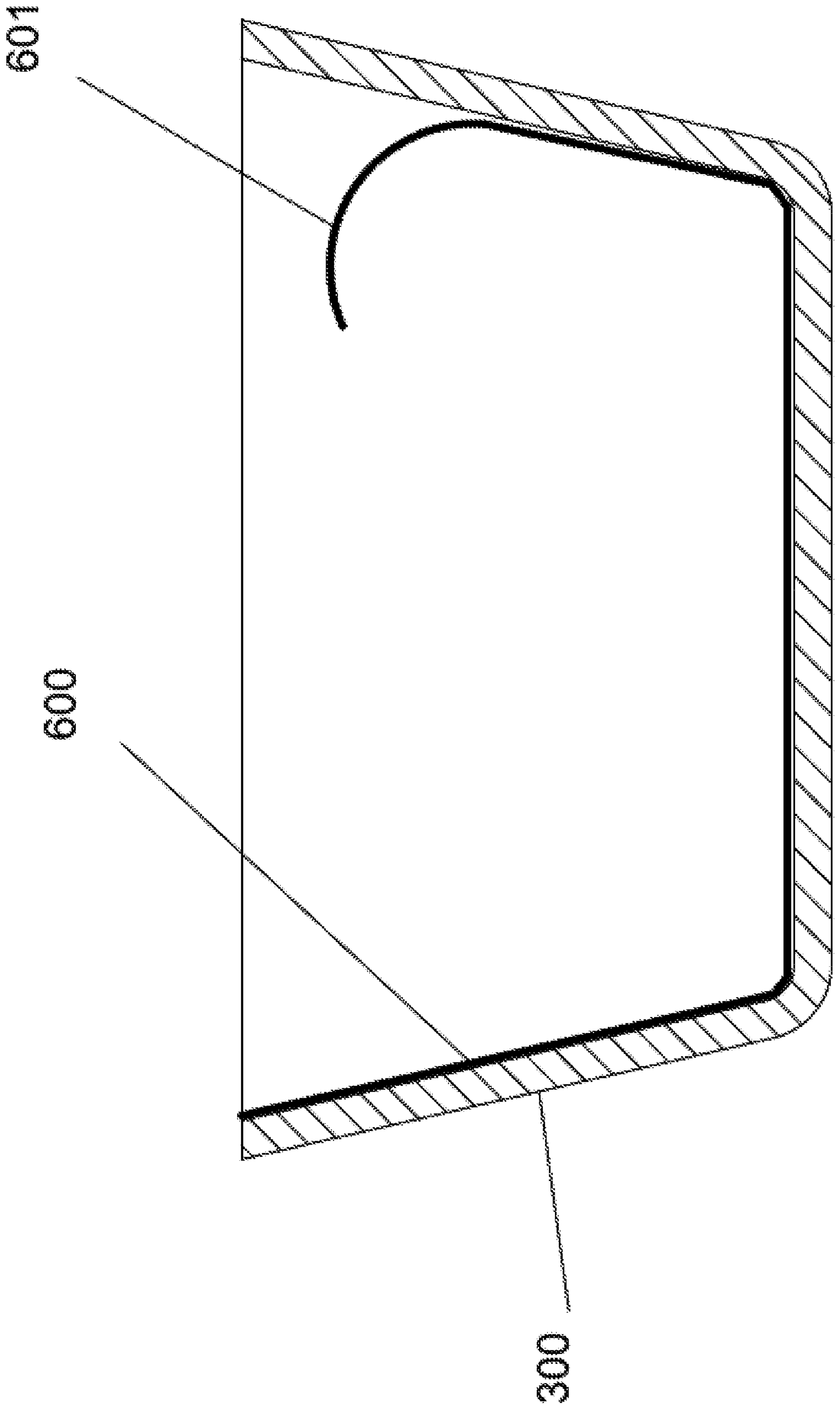
FIG. 6 schematically illustrates the discarding of a used liner by peeling.

FIG. 5 schematically illustrated an equipment processing head 500, which can be of any type, such as, for instance, a stirrer, chopper, "guitar" mixing head etc. Processing heads can be located in several positions relative to the container, depending on its driver coupling (whether it is driven from above, bottom, side etc.). Control unit 101 contains a driving module to enable this head coverage. Whenever its function, shape and surface permit, the processing head can also be covered with a shielding liner, after which shielding is completed and the covering system is withdrawn from the scene enabling processing activity. If the processing head is of a type that cannot be coated, then it will be the only part of the equipment requiring cleaning or replacing after operation. Once coating and curing are completed, the solid liner completely shields the working surface and the processed liquids or solids do not contact or foul the equipment working surfaces throughout the entire processing cycle. When processing is completed, products are removed from the processing equipment. FIG. 6 illustrates the removal of the liner 600, which is easily peeled away as illustrated by arrow 601. The liner is then discarded, for instance to a proper bio-degradable waste can, or to a regular waste can or to a recycle bin or any other discarding process possible. Now the processing equipment is ready to start another process cycle, or to be stored, without the need for cleaning.

Figure 2:
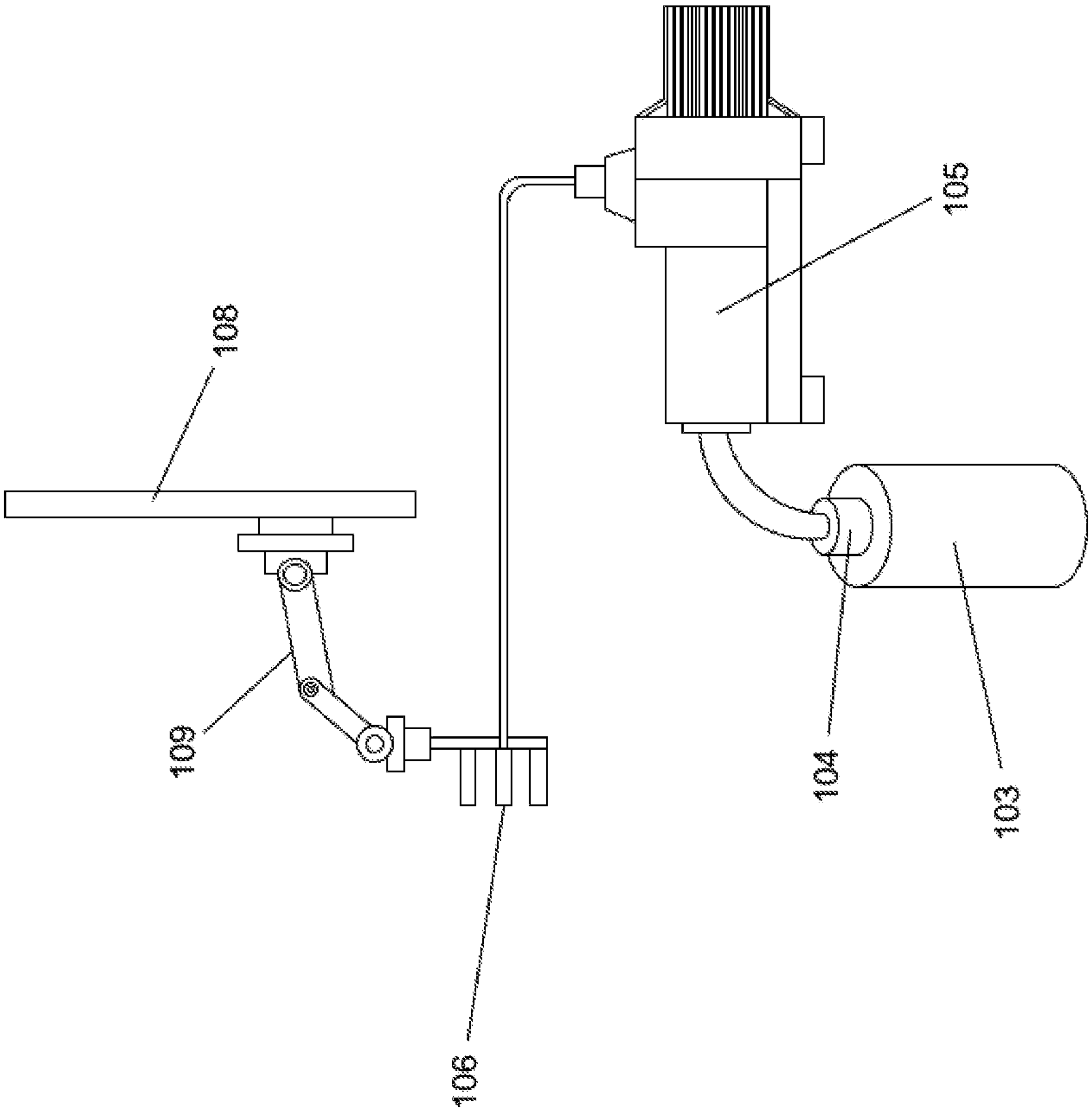
FIG. 2 schematically shows a detail of a liner material supply subsystem, taken from FIG. 1.
Figure 4:
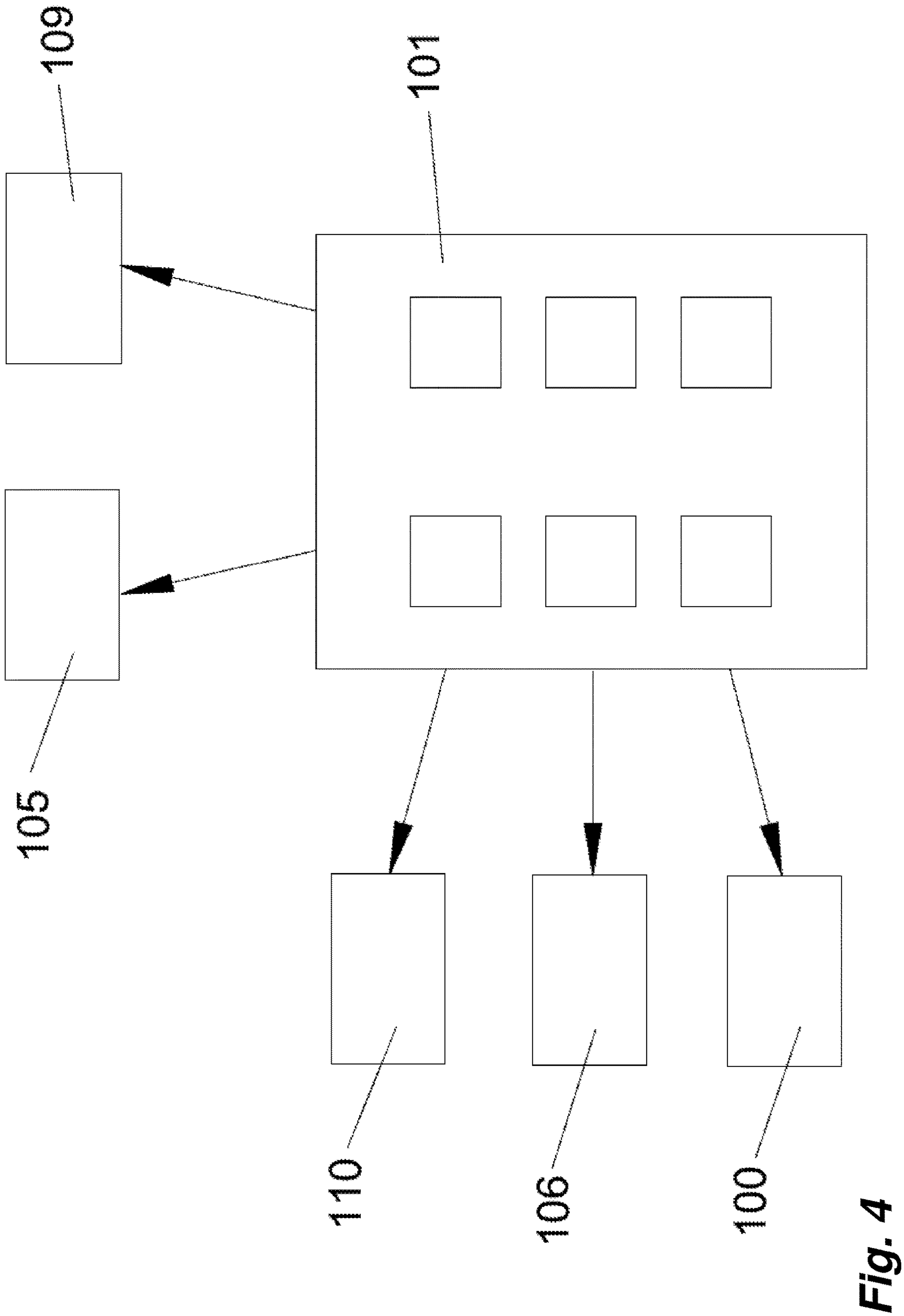
FIG. 4 is a schematic illustration of the central control of the system described in FIG. 1.

FIGS. 2 and 4 show details of the system of FIG. 1, using the same numerals thereof.

A variety of embodiments of this system can be provided by integrating any combination of the following functional, technical, physical and materialistic characteristics, properties and parameters—following the same basic materials and functionality:

a. Any appropriate covering liner materials—preferably bio-degradable but also recyclable (plastic, polymeric, metallic, etc.);
b. Any appropriate liner dimensions (length, width, thickness);
c. Any appropriate processing equipment's material, size, dimensions, structure and topology;
d. Any appropriate processing head material, dimensions and shape (stirrer, "guitar", chopper, etc.);
e. Any appropriate liner strength and other mechanical properties;
f. Any relevant operational temperature range of production process;
g. Any appropriate adhering parameters;
h. Any appropriate to-be-processed materials (food, cosmetics, pharmaceutical, etc.);

i. Any operational payload carrying arm and driving mechanism;
j. Any method of active surfaces structure and dimensions acquisition (manufacturing CAD file, in situ mapping/scanning);
k. Any appropriate liner peeling method;
l. Any appropriate final sanitation method; and
m. Any appropriate method for discovering remainders from the liner peeling process.

The above detailed description relates to an embodiment having an add-on system assembled as an add-on remote unit, whose components do not physically touch the processing equipment, with only the sprayed material, curing and mapping beams and peeling gripper contacting the equipment's active surfaces. In another embodiment of the invention the elements described above are integrated as a sub-system, and the liner production components is pre-designed to optimally and functionally be embedded in the processing equipment hardware and control unit.

In yet another embodiment of the invention, if shielded surfaces geometry and dimensions are acquired from the device manufacturer CAD file upfront, the mapping head can be eliminated, since it is unnecessary unless the system serves other processing units not having that file or prior knowledge.

In yet another embodiment of the invention the processing head coverage is devised such that linear 3D motions is controlled by the control unit (101) but rotation can be applied by the processing head itself.

EXEMPLARY PROCESSES

The following process schemes will further illustrate the invention through illustrative coating and coating removal examples.

Liner Coating

Figure 7:
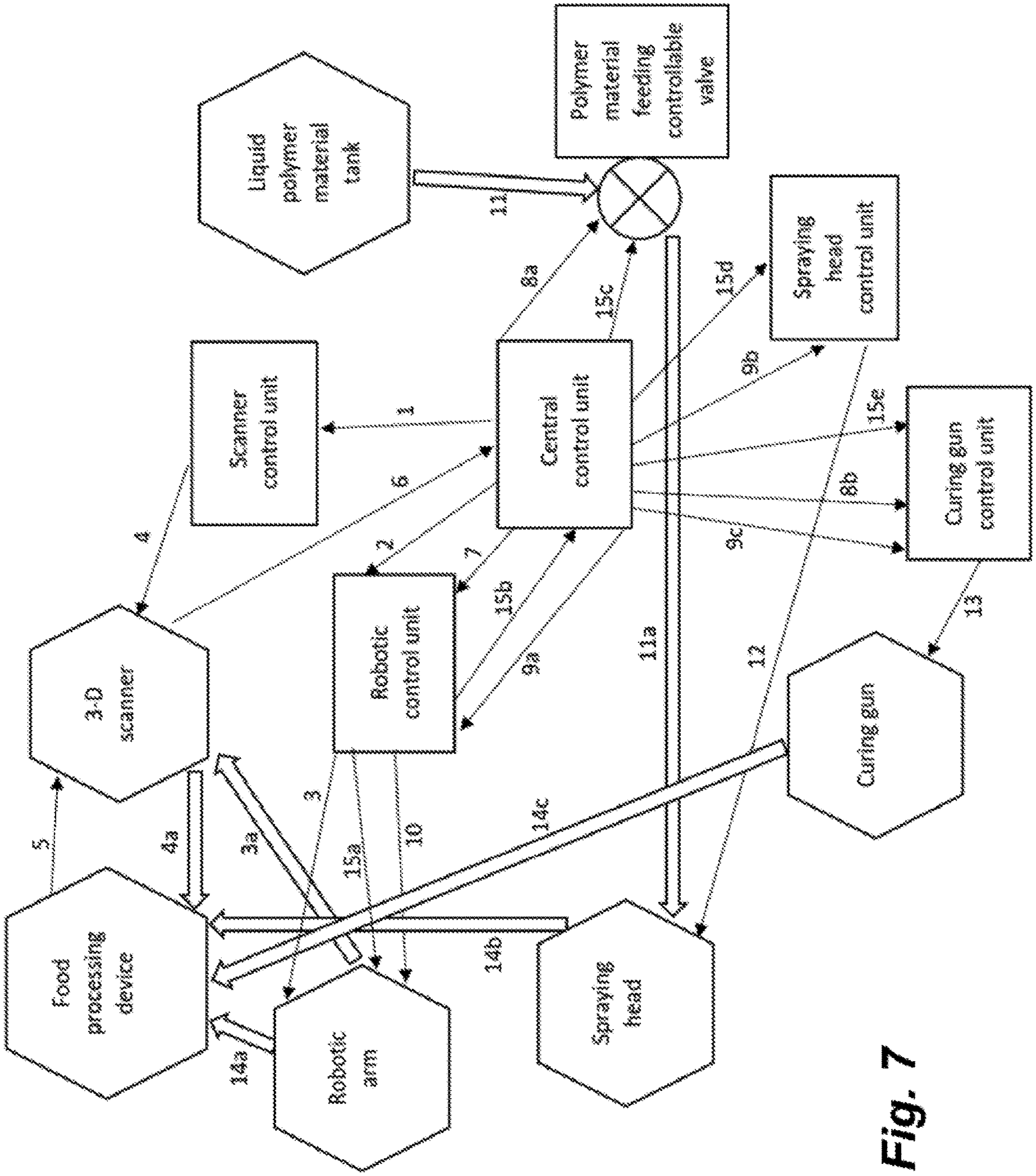
FIG. 7 shows a liner forming process scheme according to one embodiment of the invention.

FIG. 7 shows a liner forming process scheme according to one embodiment of the invention. In the figure a hexagon indicates a hardware unit, a rectangle indicates a control module/unit, a simple arrow (→) indicates an electronic signal or information such as, for example I/O, and a full arrow indicates a physical activity, such as, for instance, scanning, motion, spraying. The numerals shown in solid rectangles indicate the sequence of steps, as follows:

1. Central control unit drives scanner control unit to initiate scanning and/or mapping of target food processing device;
2. central control unit initiates the robotic control unit;
3. The robotic control unit triggers the robotic arm motion, moving (3*a*) the scanner that is attached to it. The spatial definitions of the volume to be scanned are pre-fed into the central control unit;
4. The scanner control unit operates the scanner, and (4*a*) the scanner is driven into the food device and (3-D) scans and maps it;
5. The food device topography data is acquired by the scanner, where it is transformed into a mapping file;
6. This mapping file is sent to the central control unit, where it is transformed into an in-food-processing-device trajectory for the robotic arm to which the payload (spraying head and curing gun) is attached to, to ensure full active face masking;
7. This trajectory is fed into the robotic control unit;
8. Spraying material flux parameters and curing parameters are fed (or extracted from memory) into the central control unit—and sent to properly set the (8*a*) controllable valve and (8*b*) curing gun parameters;
9. Masking process is triggered by the central control unit, by triggering the various control modules:
   a. The robotic control is triggered.
   b. The spraying head control is triggered.
   c. The curing gun control is triggered.
10. The robotic arm is sent into motion following the previously set trajectory, carrying the spraying head and the curing gun;
11. Material starts to flow from the liquid polymer material tank to the controllable valve, and through it (11*a*) to the spraying head;
12. The spraying head is activated;
13. The curing gun is activated;
14. Liner forming starts:
   a. The robotic arm moves along the pre-assigned trajectory.
   b. Material is sprayed on the target device active surfaces.
   c. Fast curing follows—with the pre-determined delay.
15. Robotic control unit terminates (15*a*) the robotic arm motion when reaching the end of the pre-defined trajectory, sends termination signal (15*b*) to the central control unit, which sends shutdown signals to the controllable valve (15*c*), to the spraying head control unit (15*d*) and to the curing gun control unit (15*e*).

Liner Peeling

Figure 8:
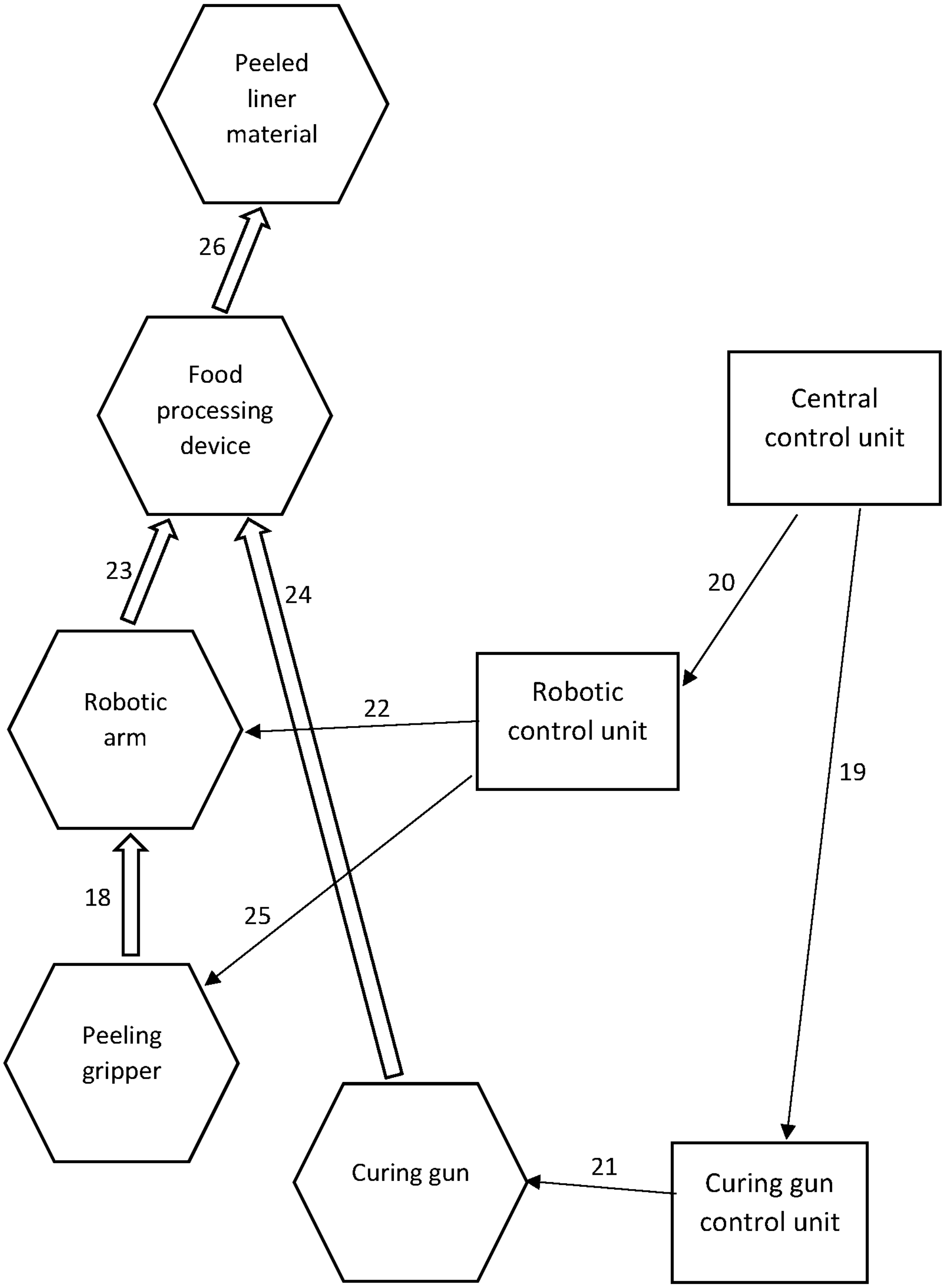
FIG. 8 schematically illustrates a peeling process of a used liner, according to one embodiment of the invention.
Figure 9:
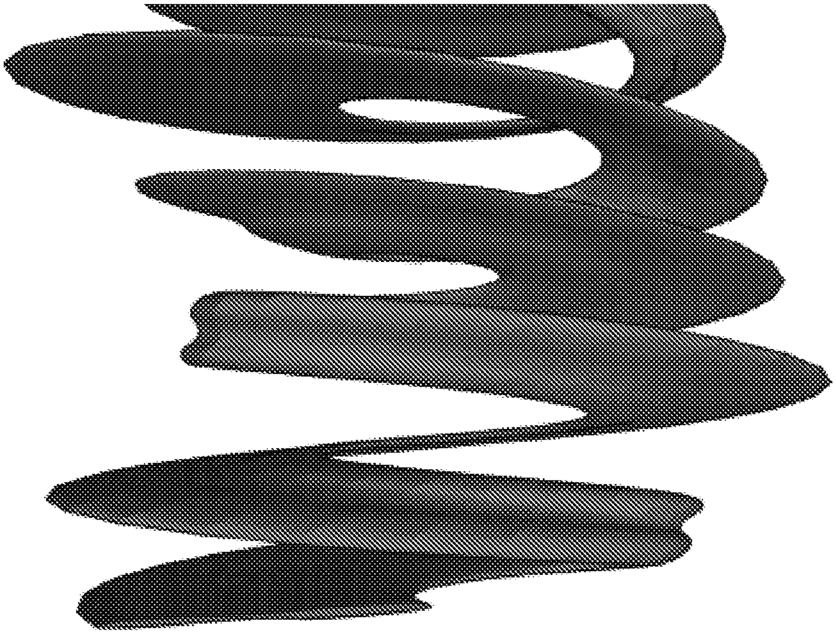
FIG. 9 schematically illustrates one embodiment of the liner peeling trajectory.

At the end of material processing, the shielding liner must be removed. This can be performed in many ways, e.g., mechanically, manually, chemically, etc. FIG. 8 schematically illustrates a peeling process of the used liner, according to one embodiment of the invention. Broadly speaking, the following steps are performed:

1. After food products are removed from the processing container, an energy intense beam (e.g. from the existing curing gun operated with higher intensity) is sent along a pre-determined spiral trajectory, based on the initial mapping of the container active surface performed by the 3-D scanner/mapper.
2. This action creates a spiral soft/physically weakened line in the used liner's material, and depending on the intensity of the beam, even a cut—full or perforated. This line defines and forms a continuous spiral "strip" in the yet adhering liner, much like a continuously peeled apple skin, as schematically illustrated in FIG. 9. The external surface in the peeled apple's skin example represents, in this illustration, the internal surface of the liner that was in direct contact with the host container.
3. According to one embodiment of the invention, the liner strip can be peeled off manually. According to another embodiment, the strip may be automatically peeled off.

In one embodiment, a gripper is attached to the robotic arm. The robotic arm payload is sent into the food device container space, the edge of the strip is grasped by the gripper, and the robotic arm payload follows exactly the above mentioned trajectory, performing a full end-to-end peeling of the liner. Finally, the peeled liner material is discarded.

In the exemplary liner peeling process according to one embodiment of the invention shown in FIG. 8, a hexagon indicates a hardware/material unit, a rectangle indicates a control module/unit, a simple arrow (→) indicates an electronic signal or information such as, for example. I/O, and a full arrow indicates a physical activity, such as, for instance, motion, peeling. The numerals shown in solid rectangles indicate the sequence of steps, as follows:

18. A peeling gripper is attached to the robotic arm adjacent to the curing gun, replacing the spraying head;
19. central control unit loads the cutting parameters into the curing gun control unit, including the delay between cutting and actual peeling;
20. central control unit loads the pre-determined slitting motion trajectory into the robotic control unit;
21. curing gun is activated;
22. robotic arm is triggered into motion;
23. robotic arm payload (curing gun and peeling gripper) is driven into the working space;
24. curing gun is cutting the spiral slit along the predetermined required path;
25. peeling gripper is activated;
26. peeling gripper grasps the edge of the formed strip, and peels the liner material.

Finishing Activities

After removal of the liner, additional finishing activities may be performed according to one embodiment of the invention, to ensure proper removal of the liner material and sanitation of the equipment. The steps performed according to a particular embodiment are as follows:

1. Immediately after the liner peeling a high-resolution camera is mounted on the robotic arm, which is sent into the device's container space and operated to acquire images of the container's walls after the liner is removed. The digital picture(s) are sent into the central control unit, and analyzed by a high resolution algorithmic tool. Algorithms suitable for this purpose are well known to the skilled person and therefore are not discussed herein in detail, and may be, for instance, those available at https://elad.cs.technion.ac.il/wp-content/uploads/2018/02/Book_ImageProcessing.pdf, or the well-known MATLAB processing tools, (e.g. http://www.imageprocessingplace.com/DIPUM-3E/dipum3e_main_page.htm), to reveal any un-peeled mini or micro liner material "island" that may have been left, and the overall result is compared to a pre-decided acceptance quality threshold. It should be noted that any remaining material will be coated by new liner deposition for the new cycle.
2. The curing gun (e.g., a UV one) is operated now at a sanitation-oriented, pre-determined energy flux, and driven back by the robot into the food device container, for example (but not exclusively) following exactly its previous curing trajectory, flooding the walls with a bacteria-killing irradiation, eliminating any bacteria that may be present. This operation can also be performed as a new cycle pre-production activity.

Figure 10:
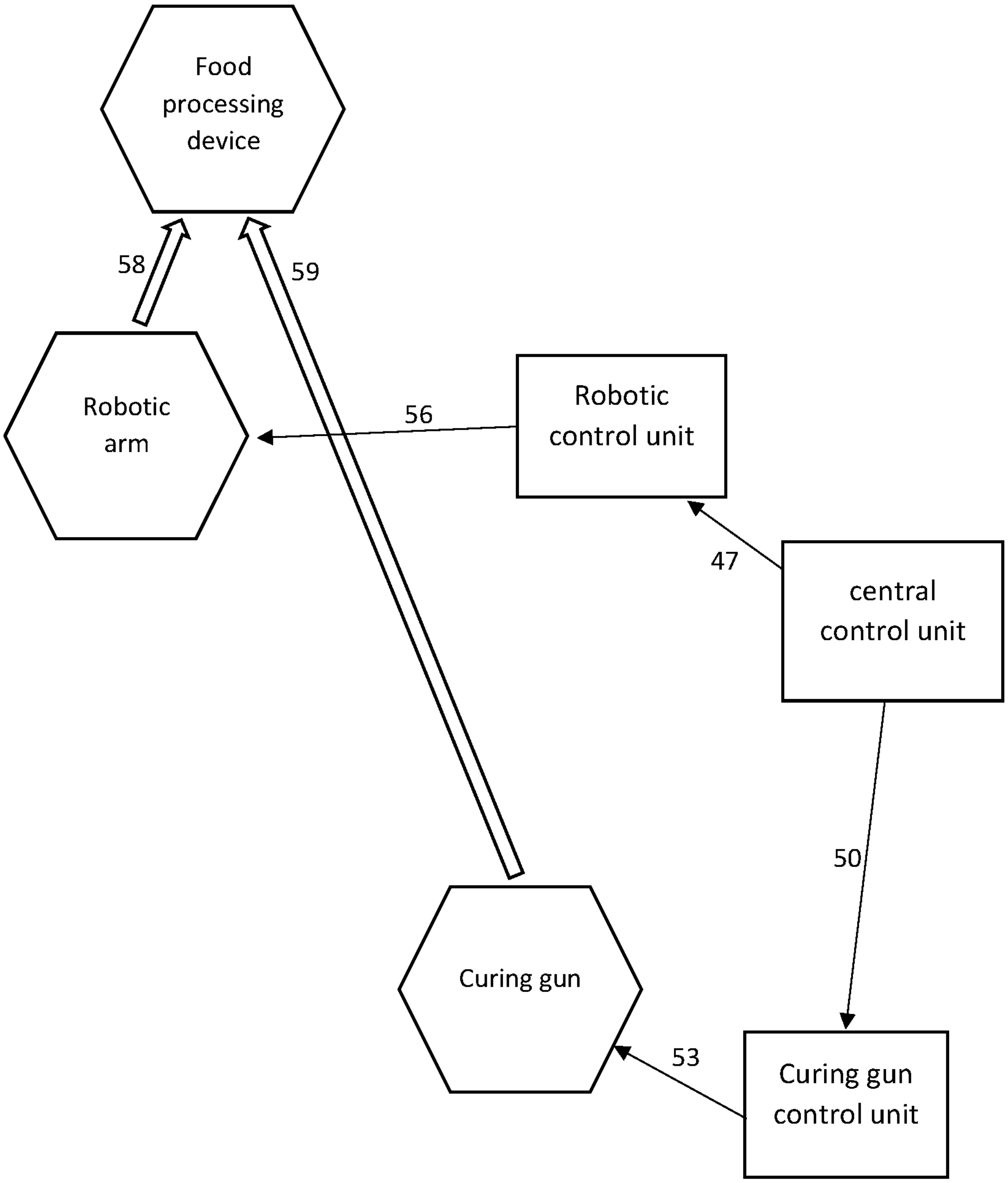
FIG. 10 schematically illustrates a sanitation step of an exemplary equipment, using a curing gun.

The numerals shown in FIG. 10 in solid rectangles indicate the sequence of steps, as follows:

47. central control unit loads the pre-determined sanitation motion trajectory into the robotic control unit;
50. central control unit loads the sanitation parameters into the curing gun control unit.
53. curing gun is activated;
56. robotic arm is triggered into motion;
58. robotic arm is driven into the food device space;
59. curing gun is activated to flood the walls with sanitizing irradiation.

All the above description of embodiments of the invention have been provided for the purpose of illustration and are not intended to limit the invention in any way, except as defined in the appended claims.

The invention claimed is:

1. A method for the in situ production and weakening of a liner suitable to shield active surfaces of an apparatus for processing of liquids and/or solids from coming into contact with, and being fouled by, the liquids and/or solids being processed, the method comprising:

providing a system comprising a spray head and a liner weakening apparatus, the spray head adapted to spray a layer of a polymeric material onto a surface;

directing the movement of said spray head according to data pertaining to the active surfaces;

spraying the layer of the polymeric material onto the active surfaces to produce a shielding liner in situ for subsequent processing of the liquids and/or solids thereon;

and after the processing of liquids and/or solids have been completed, weakening the shielding liner by the liner weakening apparatus for subsequent removal of the shielding liner from the active surfaces.

2. The method according to claim 1, further comprising curing the layer of material sprayed onto said surface, thereby to produce a shielding layer in situ.

3. The method according to claim 1, wherein the polymeric material is self-curing or solidifies without the need for curing.

4. The method according to claim 1, further comprising sanitizing the active surfaces before the spraying of the polymeric material.

5. The method according to claim 4, further comprising removing a weakened shielding liner previously formed on the active surfaces before spraying the polymeric material.

6. The method according to claim 5, wherein removal of the previously formed liner is performed by a gripping apparatus gripping the weakened liner and exerting pulling forces thereon in a direction perpendicular to the active surfaces.

7. The method according to claim 5, wherein the weakened shielding liner is removed in essentially a single piece.

8. The method according to claim 1, wherein the liquids and/or solids being processed are food materials.

9. The method according to claim 1, wherein the liner weakening apparatus utilizes an energy intense beam.

10. The method according to claim 1, wherein the polymeric material comprises direct food contact approved material.

11. The method according to claim 10, wherein the polymeric material comprises at least one of direct food contact approved allyl monomers, soluble starch, WPI, gelatin, alginate, unsaturated fatty acid.

12. A method for the in situ production and weakening of a liner suitable to shield active surfaces of an apparatus for processing of liquid and/or solid food materials from coming into contact with, and being fouled by, the liquid and/or solid food materials being processed, the method comprising:

providing a system comprising a spray head and a liner weakening apparatus, the spray head adapted to spray a layer of a polymeric material onto a surface;

directing the movement of said spray head according to data pertaining to the active surfaces;

spraying the layer of polymeric material onto the active surfaces to produce a shielding liner in situ for subsequent processing of the food materials thereon;

and after the processing of the food materials have been completed, weakening the shielding liner by the liner weakening apparatus for subsequent removal of the shielding liner from the active surfaces.

* * * * *